United States Patent [19]

Leenhouts

[11] 4,164,693

[45] Aug. 14, 1979

[54] METHOD AND SYSTEM FOR PRODUCING LINEAR CONTOURING MOVEMENT

[75] Inventor: Albert C. Leenhouts, Harwinton, Conn.

[73] Assignee: The Superior Electric Company, Bristol, Conn.

[21] Appl. No.: 474,672

[22] Filed: May 30, 1974

[51] Int. Cl.² ............................................. G05B 19/24
[52] U.S. Cl. ................................. 318/573; 318/570; 318/571; 318/574
[58] Field of Search ............... 318/696, 570, 571, 573, 318/574

[56] References Cited

U.S. PATENT DOCUMENTS

| | | | |
|---|---|---|---|
| 3,417,303 | 12/1968 | Rueteler | 318/571 |
| 3,443,178 | 5/1969 | Reuteler | 318/571 |
| 3,461,365 | 8/1969 | Newland et al. | 318/696 |
| 3,525,917 | 8/1970 | Leenhouts | 318/570 |
| 3,585,478 | 6/1971 | Leenhouts | 318/696 |
| 3,752,098 | 8/1973 | Logan et al. | 318/571 |
| 3,794,900 | 2/1974 | Kobayashi et al. | 318/696 |

Primary Examiner—J. V. Truhe
Assistant Examiner—Eugene S. Indyk
Attorney, Agent, or Firm—Ernest W. Junkins

[57] ABSTRACT

A method and system for producing relative movement of an element along two perpendicular axes to closely approximate a desired path with the movement being sub-divided into a plurality of successive lengths with a determination being made of the number of steps for each axis that is needed to constitute each length. The number of steps in adjacent lengths on each axis is made to vary only within a constant amount so that the minimum and maximum lengths of each next length is determinable from its preceding length. The determination for each length involves calculating in one operation the deviation from the desired path for a minimum length and then calculating the addition of individual steps thereto within limits of deviation and velocity to arrive at the most acceptable length. This reduces the number of calculations as compared to prior known systems which calculate each individual step.

The determination for each length produces a number for each axis and each number is translated into essentially constant rate pulses occurring over a time interval. The time interval is preferably made constant for all lengths and is dictated by a motor means ability to translate a pulse into a step so that at the end of each time interval, the motor means velocity essentially equals the pulse rate on each axis in the length.

25 Claims, 10 Drawing Figures

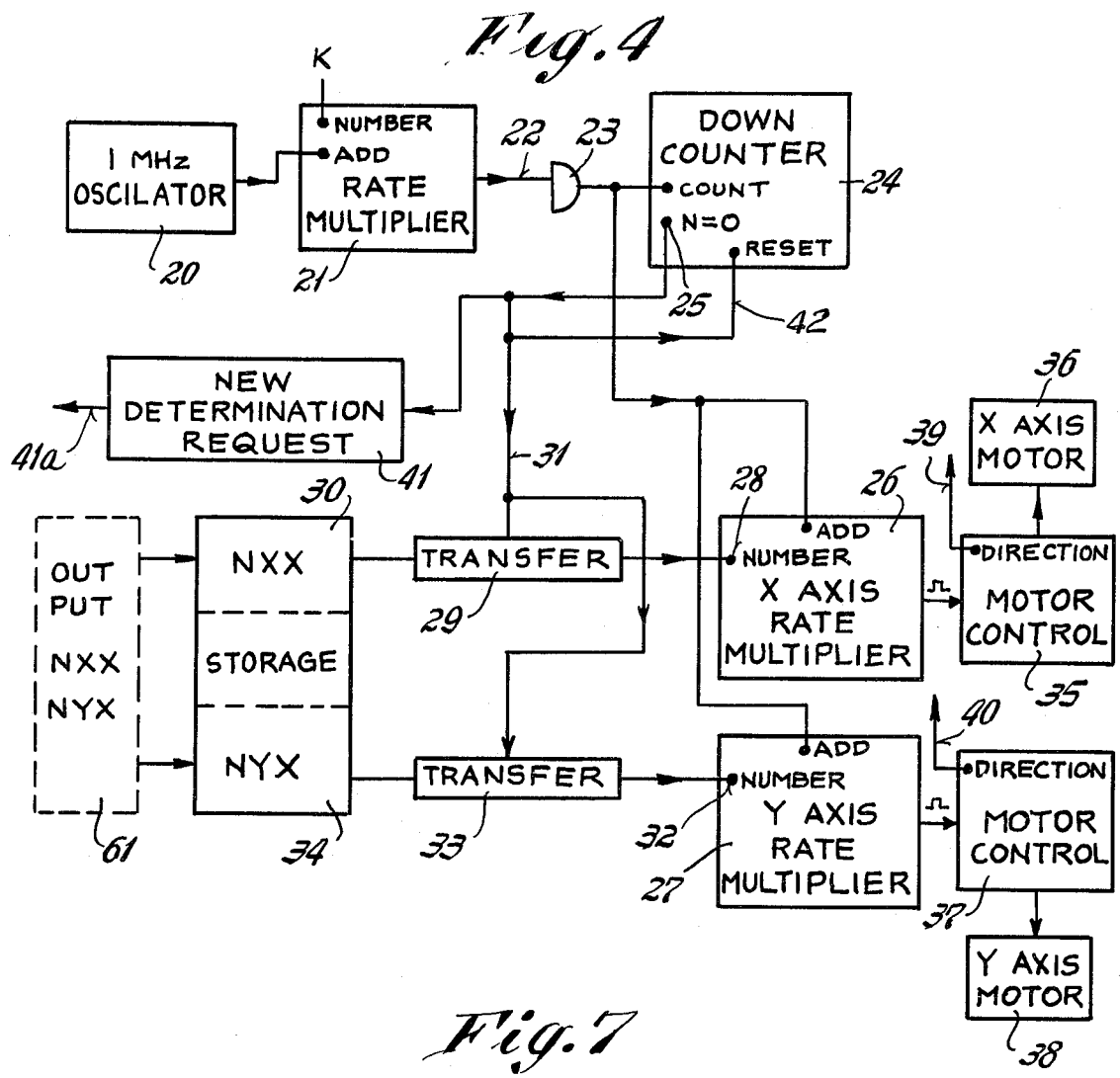
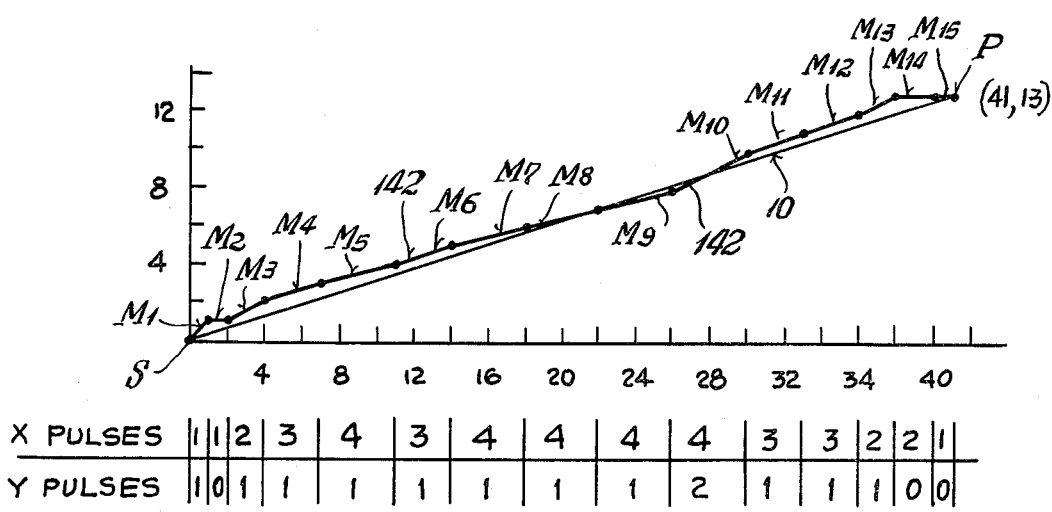

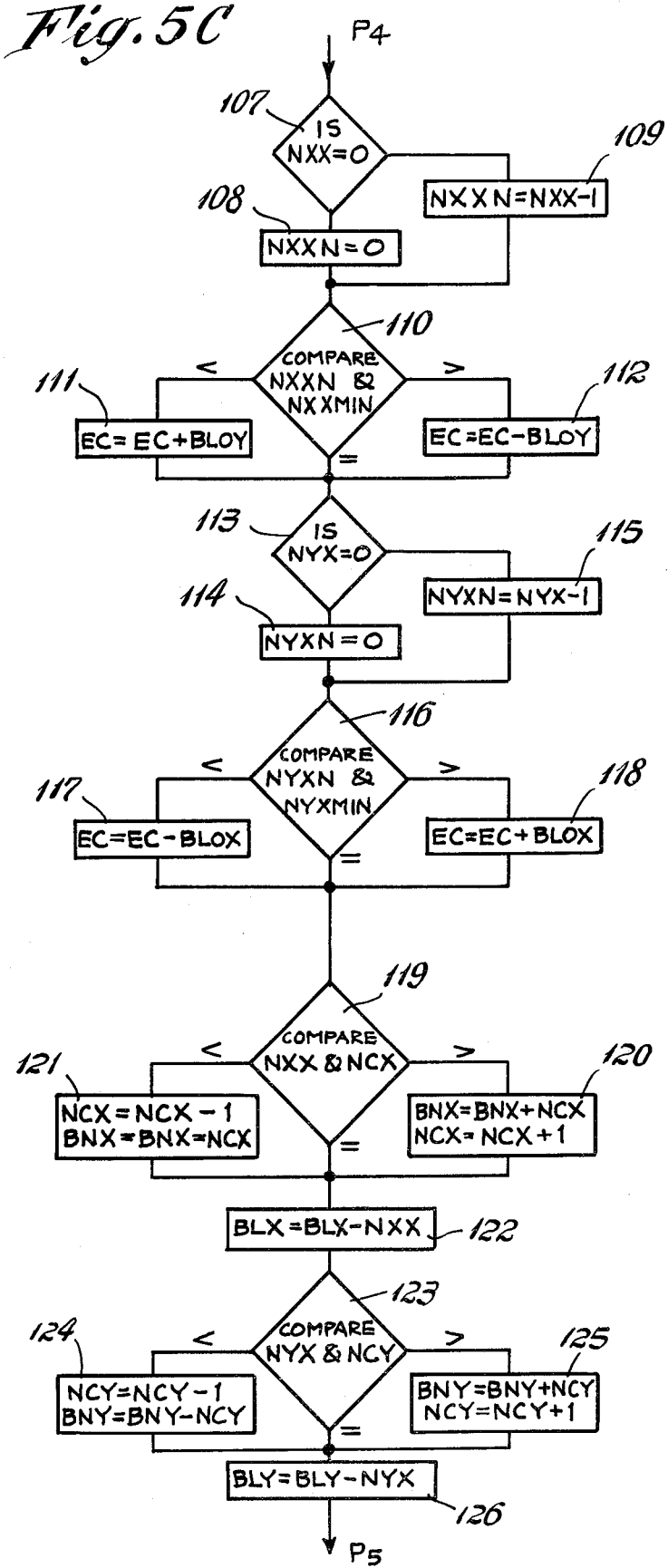

METHOD AND SYSTEM FOR PRODUCING LINEAR CONTOURING MOVEMENT

The present invention utilizes essentially the basic principle of linear contouring disclosed in U.S. Pat. No. 3,525,917, assigned to the assignee of the present invention which discloses a system for controlling the relative movement of a tool or element along an actual path by taking successive incremental movements or steps on one or the other of the perpendicular axes. The axis selected for each step is made by comparing the deviation of the actual path after each step with the desired path and then selecting that axis for the next step which produces or tends to produce a crossing of the desired path. By continually selecting which axis successive steps are to be taken, an actual path is produced which does not deviate from the desired path by more than the extent of one step. This type of providing linear contouring movement is sometimes referred to as an algebraic discrimination type or method in that it uses in selecting for each step only the relative actual deviation, not a numerical value of the actual deviation.

While such a method and system has been found satisfactory, it tends to place a finite limit on the speed at which the steps may be determined, and hence the time required to complete a path. Additionally it requires circuitry that is dedicated solely thereto during the movement which prevents reducing the circuitry required in a numerical control system by the preventing of the time sharing of such circuitry with other operations. Moreover it tends to require further circuitry to assure that the steps selected are both within a motor's ability to execute each step and within velocity limitations.

It is accordingly an object of the present invention to provide a method and system for linear contouring which substantially reduces both the number of determinations required and the time required for each determination.

Another object of the present invention is to achieve the above object with a method and system that is extremely susceptible to being used with a properly programmed general purpose computer and yet one which does not normally require the computer to be completely dedicated thereto during a movement so that it may be time shared for other calculations.

A further object of the present invention is to provide a method and apparatus for effecting movement along an actual path by determinations of successive lengths with each length normally including a plurality of steps for each axis, in which any variation in the number of steps and their rate on each axis between successive lengths is within a digital motor means ability to assuredly produce each step upon command and in which velocity limitations may be easily imposed on the length.

A further object of the present invention is to provide a motor control circuit for accepting information consisting of a number of steps that are to be taken on each axis during a time interval and for causing each axis motor to produce these steps approximately evenly on each axis over the duration of the time interval.

In carrying out the present invention of producing linear contouring movement, there is initially provided a pair of motor means for producing the actual movement. One motor means is connected to provide relative movement on one axis while the other is connected to also produce relative movement on another axis perpendicular thereto. Each motor means produces an equal length incremental movement or step essentially simultaneously with the receipt of a pulse and each pulse thus represents a step. The rate of the pulses sets the motor velocity so that by controlling the rate and number of pulses, control over the motor movement is thus achieved.

The present invention uses the same type of determinating the steps to the two axes as in the above-noted patent but rather than determine individually each step, determines them in groups with each group producing a movement length. The extent of each length is made to be within preselected limits of the extent of a prior length with the limits being set by the motor means ability to produce the length. Preferably as will be hereinafter set forth the limits are plus and minus one step between lengths for each axis. Thus, if a determination for a group for one length is X steps for one axis and Y steps for the other axis then the next length can only have numerical values of X+1, X−1 or X steps and Y+1, Y−1 or Y steps. It thus becomes known from the values in a present length all the possible values for the next length and that the minimum values in the next length will be X minus 1 and Y minus 1 steps.

A single determination is then made of the deviation produced by a minimum movement of X−1 and Y−1 steps which results in the same value of deviation as if each of the steps were individually determined in accordance with the disclosure of the before-mentioned patent. Thus, only one calculation need be made for the minimum move irrespective of the number of steps therein. After this minimum number determination of the deviation, the present invention then determines individually which of the nine possible values produces the most acceptable length within the boundaries of deviation and velocity starting with the minimum length. These possible values of a group are in addition to minimum length X−1, Y−1 are X−1, Y; X−1, Y+1; X, Y−1; X, Y,; X, Y+1; X+1; Y−1; X+1, Y; and X+1, Y+1 with normally only a few of these possible group values requiring a calculation. In this manner irrespective of the number of steps in a length, only a maximum of five calculations are required with the first being the minimum length and the rest additions thereto with there normally being fewer calculations than the maximum number. This is irrespective of the total number of steps in a length.

The movement determined for a time interval occurs along both axes simultaneously and in some instances there may be a limitation on the movement velocity as when there is a tool cutting operation having a selected feed or cutting rate. The present invention, if such is required, considers the effect of the values in the selected group with respect to velocity limitations to reject possible values that excessively exceed commanded velocity limitations.

The information determined is supplied as electrical representations of a number for each time interval with there being an X number and a Y number. The numbers are converted by a circuit that includes a rate multiplier for each axis in the specific embodiment herein described into a train of pulses having the same number of individual pulses for the time interval as the number. The pulses are spaced approximately evenly over the duration of the time interval to thereby have the same rate. Each pulse is then translated by its motor means into a step or incremental movement essentially simultaneously with the receipt of each pulse.

Other features and advantages will hereinafter appear.

In the drawings:

FIG. 4 is a block diagram of a circuit for producing the pulses and movement for each length when provided with the numerical representation of a length.

FIG. 7 is a sketch of the same commanded path as in FIG. 1 and the actual path produced by the further embodiment of the method and in which a velocity limitation is imposed.

Figure 1:
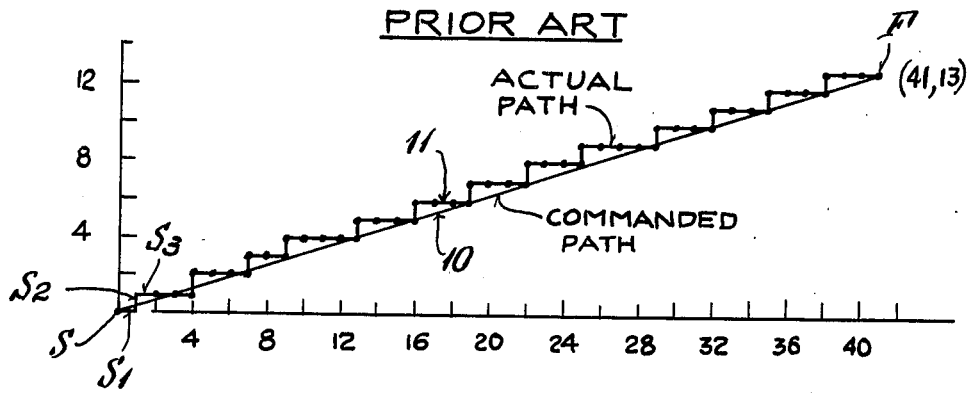
FIG. 1 is a sketch of a commanded path and the actual path produced using the prior art, each step a determination, process.

Referring to the drawing, FIG. 1, a line 10 is denoted commanded path which is the path which may be programmed in a numerical control system by indicating that a movement of 41 steps on an X axis and 13 steps on a Y axis is needed between the starting position S and the end position F. The algebraic compensation type of linear contouring disclosed in the previously mentioned patent will render a determination on which axis each successive step is to be taken for the total number of steps required with there thus being 54 steps and thus 54 determinations. The actual path is indicated by the reference numeral 11 and includes a first step taken on the X axis and indicated by the character S1. A determination is made for the next step by noting that the actual path after taking step S1 is below the commanded path and hence a step on the Y axis must be taken, thus producing step S2. A determination is then made that the actual path is now above the commanded path so the step S3 is made on the X axis. Accordingly, whenever after taking a step, it is determined that the actual path deviates from the commanded path in a direction below the commanded path then the next successive step is required to be a Y axis step while if the deviation is above the commanded path then the next selected step is taken on an X axis. In this manner after 54 determinations, the system produces the actual path 11 from the position S to the position F with the actual path 11 not exceeding a maximum one step deviation from the commanded path 10.

Figure 2:
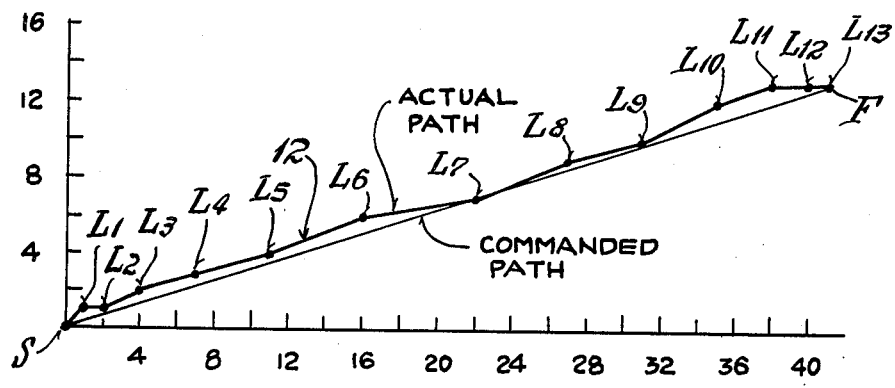
FIG. 2 is a sketch of the same commanded path of FIG. 1 and the actual path produced by the present invention together with an indication of the steps in each length.

The present invention while using the algebraic compensation type of determination sub-divides the total movement of X=41 and Y=13 into a plurality of successive lengths with each length normally having a number of steps in one or both directions that produces movement within this maximum deviation. Thus, as shown in FIG. 2 for the same commanded path 10 of X=41 and Y=13, the present invention produces the actual path indicated by the reference numeral 12. This path is composed of thirteen lengths with each length having the values of X and Y steps shown essentially immediately below its respective length. The first length, L1 which begins at the position S has an X value of 1 and a Y value of 1. For the second length, L2, X has a value of 1 and Y has a value of 0. For the third length, L3, X has a value of 2 and Y has a value of 1. For the fourth length, L4, X=3 and Y=1 while for the length, L5, the numbers are 4 and 1, etc. The final length, L13, terminates at the end position F. The total number of the X steps in the lengths equals 41 and the total number for the Y steps equals 13, which are the commanded number of steps.

Figure 3:
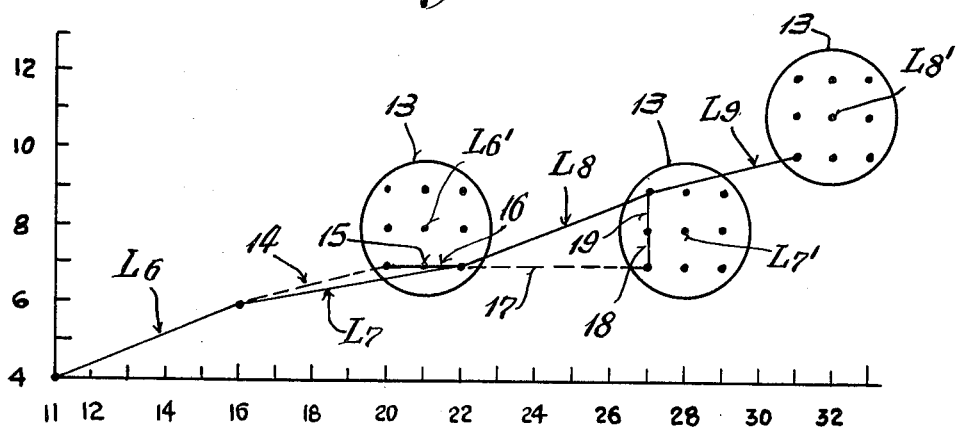
FIG. 3 is a sketch of some successive lengths.

Referring to FIG. 3 there is shown a somewhat enlarged view of the lengths L6, L7 and L8 and the manner by which these steps are determined. The length L6 is assumed to have been taken, terminating at the beginning of the length L7. For determining the number of X and Y pulses in the length L7, it is first known that the length L6 if repeated, would terminate at the point L6' which is X=5 and Y=2 steps from the end of length L6. However, as the length L7 can have each value of L6's number of steps on each axis plus or minus 1 or the same, there thus evolves a group of nine possible positions shown within a circle indicated by the reference numeral 13 with the center position having the same value for length L7 as the length L6 has. The position nearest the end of the length L6 which is the minimum length that length L7 can have is determined by subtracting one from each of the values for length L6 which thus equals 5−1 or 4 for the X axis and 2−1 or 1 for the Y axis and this minimum length for the length L7 is indicated by the dotted line 14. A single determination is made if the end of the minimum line 14 is above or below the commanded path 10 in a manner to be hereinafter described and it is found to be above the path 10.

The direction of deviation determination requires that if the minimum length be increased, (which will occur in the absence of a command to decelerate), the increase will intially be an X step so that the proposed values for length L7 become 5 and 1 and its termination indicated by the reference numeral 15. Again a determination is made if the termination point 15, is above or below the commanded path and as it is, the proposed value for length L7 is increased by another X step indicated by the reference numeral 16. As step 16 terminates above the commanded path the next increase is to be an additional X step. However, as the X value of 6 is the most that the length L7 may have by reason of the motor's ability, then the additional X step is not to be taken. Its determination, however, indicates that the number of Y steps is not to be increased from its minimum value of 1. The length L7 is thus determined to have 6 X steps and 1 Y step.

For determining the length L8, L7' is initially located being 6 X steps and 1 Y step from the end of the length L7 and again the nine possible positions which the length L8 may have are shown enclosed within the circle 13. The deviation of the minimum length of L8 is made as indicated by the dotted line 17 (X=5, Y=0) and is found to be below the commanded path which requires that the minimum values be increased by a Y step 18. Again a determination is made of this proposed length of 5X steps and 1 Y step and it is found to be below the commanded path so the proposed values for L8 are again increased by another Y step 19. Though during these determinations, the deviation indicates that an X step should be added, the minimum value of X=5 for length L8 is not increased in view of a command to decelerate. Thus the length L8 is determined to be X=5 and Y=2.

From the values of L8, the point L8' is determined (X=5, Y=2) and again the nine possible positions for the end of length L9 are indicated within the circle 13. The minimum length of L9 is set at X=4 and Y=1, a determination of the deviation of the minimum length of 4 and 1 is made and requires that the value of X be increased by 1. However, the X axis should decelerate as the movement is approaching its end so that the minimum value of X is not increased. However, as the step which should be taken is an X step, it prevents increasing the minimum number of Y steps so that the values for length L9 are the same as its minimum values, 4X and 1Y.

It will thus be seen that as between adjacent lengths the value of steps on each axis can be increased by 1, decreased by 1 or remain the same from the value of the previous length. To determine the actual length, the direction of deviation of the minimum length is initially determined by utilizing values that are one less than the preceding length. After such a determination, individual determinations are made, a step at a time to make the final values of the length which produces the deviation. Thus, for determining the values for each length it is only required that a single determination be made of the deviation which a minimum length produces and then add thereto further individual steps with each further step being individually determined to produce a length that is within the deviation and velocity limitations.

It will also further be noted that as in the case of lengths L8 and L9 restrictions can be made on the steps which may be added to the minimum length in accordance with acceleration and deceleration requirements. Even though the circle 13 for each length indicates nine possible positions, there may be in actuality, fewer possible positions because of velocity limitations. Thus, for each length irrespective of its extent, determinations involve only a calculation for the deviation produced by a minimum length move and deviations produced by the subsequent incremental moves which may require only a maximum of five determinations with the normal number being about two or three. This substantially reduces the time necessary for the determinations to be made as opposed to being made individually for each step and in addition renders such determinations extremely susceptible to being made on a programmed general purpose computer.

Referring to FIG. 4, there is shown a block diagram of a circuit for translating the numerical values of each length into pulses and steps. As the extent of each length is a distance which is equal to velocity times time, a length may be defined in accordance with this formula by any two out of the three parameters, either distance (number of pulses), or velocity (pulses per second) or by time (the duration in which the pulses must be produced).

In the present embodiment, it has been found desirable to use the distance and time parameters as the time parameter may be held constant for all lengths and thus need not be individually determined for each length. With the time parameter thus held constant, only the numerical value of a distance is needed to impart information to define the desired length as to extent and velocity. Thus, each determination merely provides only a numerical number for each length which is the number of steps that the circuit of FIG. 4 is required to produce in the selected constant time interval. Each step is produced from a pulse and the pulses are approximately evenly spread over the duration to have effectively a constant rate for the duration.

The constant time interval is the same for both axes and hence also enables the pulses and steps of both axes to be produced evenly and simultaneously over the same time interval. This also permits, if desired, one or more additional axis movement to be further simultaneously moved during the same time interval.

The duration of a selected time interval is determined by the motor means finite ability to translate each pulse into a step and especially its ability to change velocity. Preferably, as disclosed herein, the maximum change in velocity is + or − one pulse between lengths. In other words, with a selected time interval, the number of pulses in one length on each axis can only change by + or − one pulse from the number of pulses in an adjacent length in order to provide a change in velocity which the motor is capable of handling and to assure that at the end of each length the motor velocity is at the same rate as the pulse rate of the length. This assures that the pulses and steps will not become more than one pulse out of simultaneousness. It is, of course, possible to select parameters that enable + or − two or more pulses if desired and the invention is not to be considered as limited solely to a one pulse difference.

One motor means that may be employed are stepping motors such as disclosed in the above-noted patent and one general maximum value of acceleration and deceleration is 40,000 steps per second squared which enables such a motor to start at a pulse rate of 200 steps per second and change its velocity pulse rate by one pulse in each 0.005 seconds. Other intervals may be selected, as for example, 0.0083 seconds if the motor means is a D.C. servo motor that has its energy regulated from a 60 $H_z$ phase controlled, rectified A.C. source.

The circuit shown in FIG. 4 is constructed to provide time intervals having a constant duration of about 0.005 seconds and includes a 1 million $H_z$ oscillator 20 that supplies pulses to a rate multiplier 21 with each oscillator pulse causing the rate multiplier to add a value of K to itself and produce an overflow pulse on its output lead 22 each time it overflows. The lead 22 is connected as an input to the count terminal of a down counter 24 which also has an N=0 terminal 25.

The lead 22 is also connected to an add terminal of an X axis rate multiplier 26 and a Y axis rate multiplier 27 with each pulse received causing the number set into each rate multiplier to be added to itself. The number terminal of the X axis rate multiplier is connected through a transfer switch 29 to an X number storage 30, denoted NXX, with an actuating lead 31 for the transfer switch being connected to the N=0 terminal 25 of the down counter 24. In addition, the number terminal 32 of the Y axis rate multiplier is connected through a transfer switch 33 to the Y number storage, denoted NYX, and indicated by the reference numeral 34. In addition, transfer switch 33 is also connected to lead 31 and hence to the N=0 terminal 25.

It will thus be understood that whenever the counter 24 has a 0 count, the transfer switches 29 and 33 are actuated transferring the numbers stored in the storage 30 and 34 into their respective rate multipliers. These numbers will be summed in their rate multipliers each time a pulse appears on the lead 22 to the count terminal of the down counter 24.

The output of the rate multiplier 26 is connected to an X axis motor control 35 which in turn is connected to control the energization of an X axis motor 36 such that the motor will produce an incremental movement or step for each pulse received by the motor control 35 from the rate multiplier 26. Similarly, the Y axis rate multiplier is connected to a Y axis motor control 37 and a Y axis motor 38 and each pulse received from the rate multiplier 27 will produce an incremental movement or step of the Y axis motor, essentially simultaneously with the receipt of a pulse. Preferably the motors 36 and 38 are reversible and the motor control may have leads 39 and 40 which are connectible in the system to provide control of the direction of movement.

There is further shown a block 41 labeled "new determination request" which is actuated each time the count of the counter 24 is equal to 0. When actuated, block 41 indicates that the motor circuit has completed one length and that information of the next length consisting solely of a number for the X and Y axes movement should be determined and placed into the storage boxes 30 and 34, as the prior length has been transferred into the rate multipliers.

The time period of about 0.005 seconds is obtained by the setting of the rate multiplier 21 and the capacity of the down counter 24. With 1 million pulses from the oscillator 20 in one second, a time period of 0.005 seconds can be obtained by setting the down counter 24 to a count of 5,000 and then counting each pulse from the oscillator 20. After the counter has received and counted to 5,000 it will have a 0 count and may be cycled again to 5,000. However, such a number (5,000) is not as desirable for counter operation as a binary number and it is preferred to utilize a capacity count of 4096 in binary form for the counter 24. To adjust the pulses from the oscillator 20 to provide such a number in approximately 0.005 seconds, the rate multiplier 21 is set to have an overflow capacity of 256 (again in binary form) and the number added to itself for each pulse from the oscillator 20 is the number of time intervals required to occur per second as set by the motor's ability to change velocity. Such a number is represented by the character K and with the above factors, and K equal to 200, the down counter 24 will receive and count 4096 pulses (its set number) in 0.0053 seconds. This is sufficiently approximate the desired time interval of 0.005 seconds as to be acceptable in view of it enabling the use of binary numbers. Moreover, by merely changing the value of K, the time interval may be easily altered to accommodate a different condition.

It is noted that each of the rate multipliers 26 and 27 is set to have an overflow capacity of 4096. This assures that it will produce the same number of output pulses during the time interval as the number to which they are set by way of their terminals 28 and 32 and which is added to itself for each pulse.

In the operation of the circuit shown in FIG. 4, with the various devices set to the values heretofore mentioned if the value of the X number is 5 and the Y number is 2 as in length L6 and the counter 24 set to a count of 4096, the rate multiplier 26 will produce five pulses in 0.0053 seconds while the Y rate multiplier 27 will produce two pulses in the same time interval which is the time required for the counter 24 to count to zero. Thus, the rate of the pulses for the X axis will be 5 divided by 0.0053 or approximately 1000 steps per second while the rate of the pulses from the Y rate multiplier will be 2 divided by 0.0053 or approximately 400 pulses per second which thus produce from the motors 36 and 38 velocities of approximately 1000 and 400 steps per second for this time interval.

Figure 5:
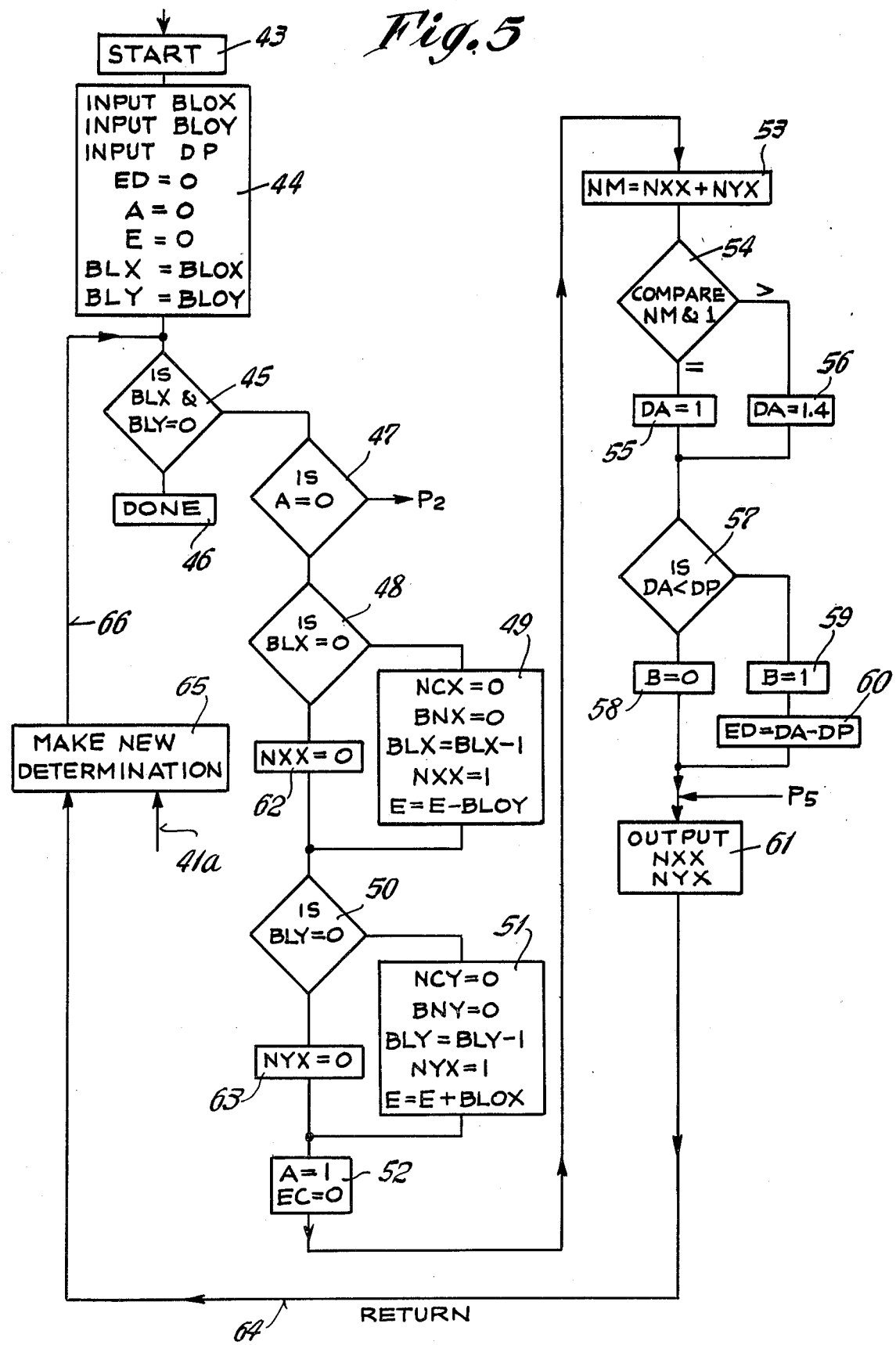
FIGS. 5 through 5C is a flow chart that may be used to program a computer to produce the information for each length.
Figure 5A:
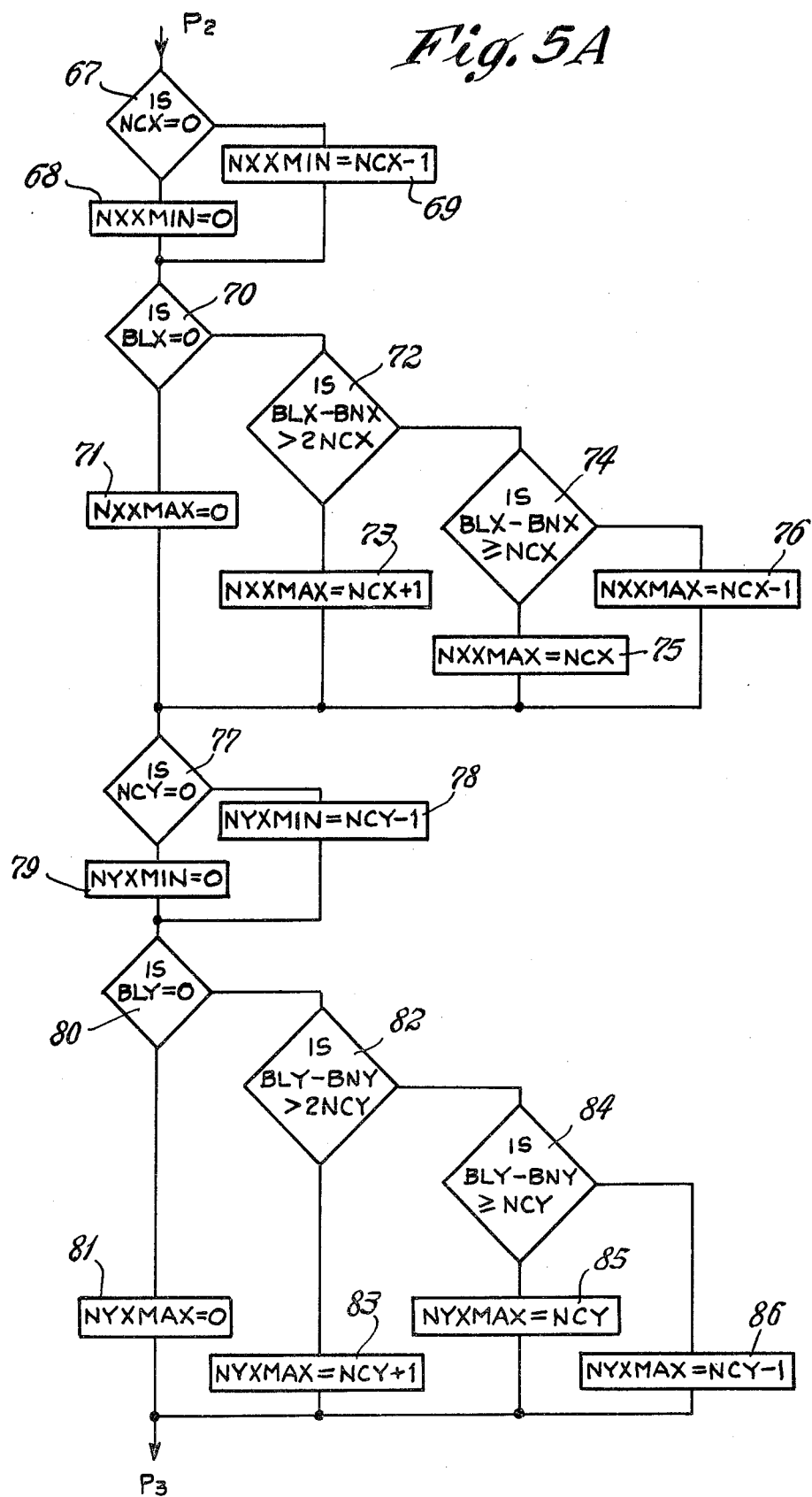
Figure 5B:
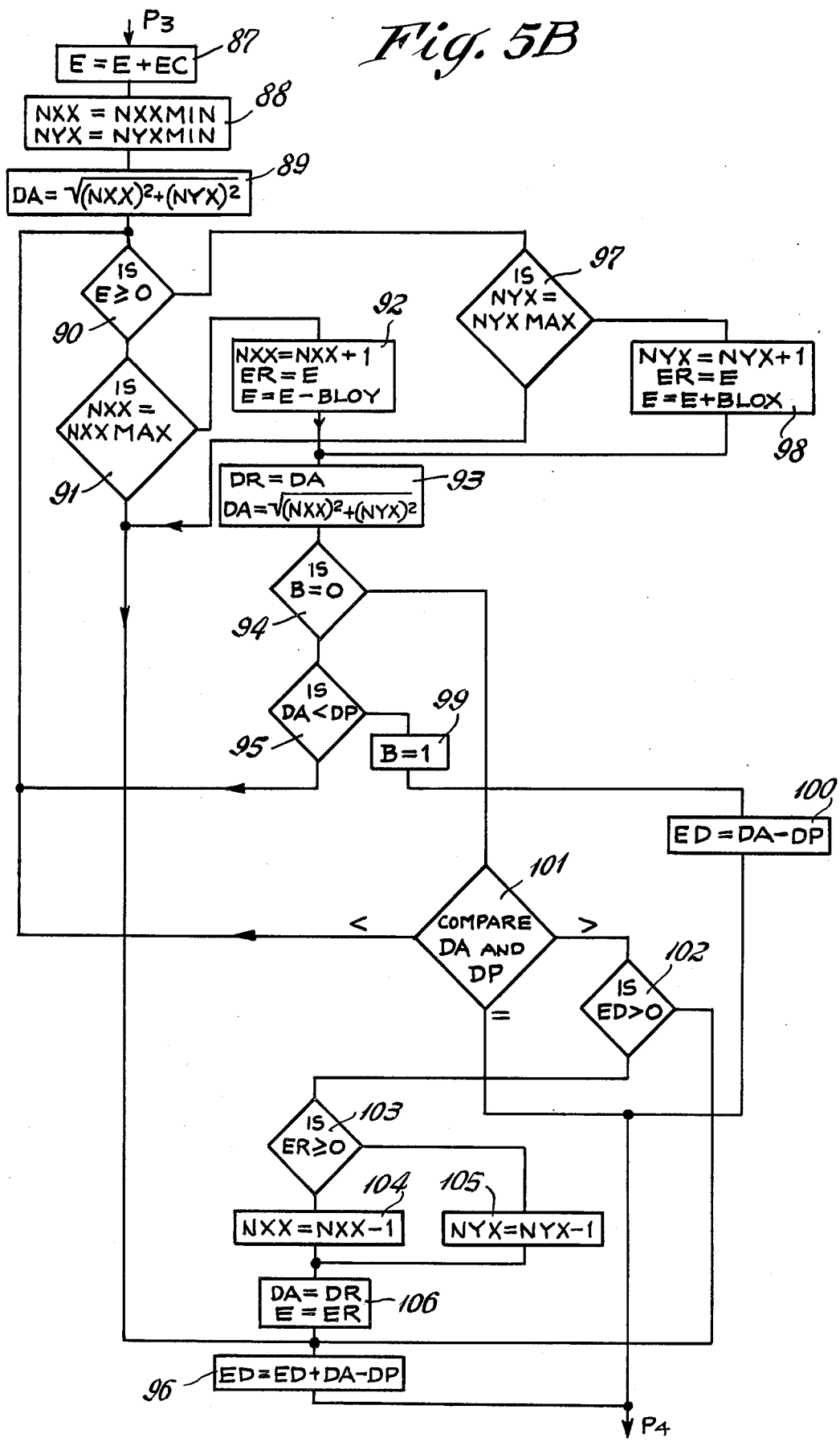

Referring to FIG. 5 which includes FIGS. 5A through 5C a flow chart is shown which may be used to prepare a program for a general purpose computer in order to carry out the method of the present invention. The various symbols used in this chart are BLX (or for the Y axis, BLY) which represents the remaining distance to move in steps on the X (and Y) axes; BLOX (BLOY) the original value of BLX (BLY); BNX (BNY) steps required to decelerate on the X (Y) axes; NCX (NCY) are the numerical axis change value for the X (Y) axes which except for the first length has its value increased by 1 for each accelerating length and decreased by 1 for each decelerating length, and NXX (NYX), the output number of pulses in each axis for each length that is introduced into the storage registers 30 and 34 after being determined by the present program. NCX and NCY are normally equal numerically to NXX and NYX especially when the maximum difference between lengths is an absolute value of 1.

Other representations include A for a flip-flop utilized to produce the information for the first length L1; E, an error register which maintains an algebraic count of the deviation of the actual path from the desired path; EC, a register that maintains the extent of the path error produced by the minimum permitted move in the next length and ER, a register that contains the error produced by the previous length. In addition, the present program may accept information of the desired maximum velocity along the actual path which could be the cutting speed or feed rate in a machine tool and is inputted as the number of steps per time interval and indicated by the representation DP. DA represents a register that stores the value of the actual velocity of a length and ED is a register that maintains a numerical count of the accumulated error velocity occurring after a length reaching or exceeding the programmed velocity.

Upon activation of a start block 43 information for a commanded move is accepted by a block 44 with the information including only BLOX and BLOY. Also if there is a limitation on the maximum velocity the value of DP in steps per length is received but if not a limitation on the move, may be automatically given a relatively high preset value. The block 44 causes the ED and E registers to be set to a 0 count, the A flip-flop set to the 0 state and the BLX and BLY registers set to the commanded move. A block 45 questions if all the steps have been taken and, if so, would produce an indication by a block 46 that the movement is complete which could be used to actuate the start block for effecting the next commanded move. However, with BLX and BLY not being equal to zero the movement is not complete and hence the information flows to a block 47 which questions if the first length has been produced. As it has not, it effects the producing of one step on each axis for the length L1 through a sequence proceeding from block 47 to a block 48 which questions if there is an X move and assuming there is, the functions set forth in the block 49 are performed with the processing then determining if there is a Y move by a block 50. Assuming there is as it is required for the actual path 12, the functions set forth in block 51 are performed after which a block 52 sets A to the 1 state and the path error register EC to a 0 count before proceeding to a block 53.

The blocks 53 through block 60 are used to find the actual velocity along the first length and to compare and accumulate the error or difference between the actual velocity and the commanded velocity, DP. Accordingly, blocks 53 and 54 determine if there is to be a move on both axes by adding the proposed X and Y numerical values of 1 and comparing their sum with 1. If equal, there is only one axis movement while if greater than one, the block 56 sets the actual path velocity DA at a value of 1.4. DA is then compared by a block 57 against the commanded path velocity DP and then if DA is less than DP then the state of flip-flop B remains 0 by block 58 and the block 61 outputs the value of the first length of NXX=1 and NYX=1 for the path 12. On the other hand if DA is greater than DP then the flip-flop B is set to the 1 state by a block 59 and the error difference between DA and DP is stored by a block 60 as a value of ED before the values of NXX and NYX are outputted.

While the actual path 12 requires movement on both the X and Y axes, if only the Y axis has movement which occurs when BLOX=0, then the block 48 will effect bypassing of the block 49 to a block 62 which sets the value of NXX as 0. On the other hand, if there is no commanded movement along the Y axis, BLOY=0, a block 63 effects bypassing of the block 51 and sets the value of NYX to 0 before proceeding to the block 52. If either value is 0, then the block 54 will produce an equal comparison and DA will be set to 1 by the block 55.

The block 61 (shown in dotted lines in FIG. 4) is connected to the storage boxes 30 and 34 to which it supplies the values for all lengths. After supplying the numerical values, a return lead 64 from the block 61 is connected to a block 65 which also has a connection to the input lead 41a from the new determination request block 41 shown in FIG. 4. When both leads 64 and 41a indicate that a request for a new determination is to be made, then the next length numerical values are produced by way of a signal on a lead 66 connected to the input of the block 45.

For the length L2, the sequence flows to the block 47 and then exits on a lead P2 to FIG. 5A by reason of A being set to the 1 state by block 52. The portion of the flow chart shown in FIG. 5A is used to determine the maximum and minimum X and Y values for a length. As the time interval has been selected such that the motor can respond to changes between adjacent lengths of not greater than one pulse, the maximum and minimum are thus no greater than 1 from the previous length values. Moreover, the number of possible values may be further reduced by inquiring if the motor is to be accelerated or decelerated. A block 67 first interrogates if the number of velocity change lengths for the X axis (NCX) is equal to 0 and if it is, then NXXMIN is set equal to 0 by a block 68. On the other hand if it is not 0, then NXXMIN is set to one less than the NCX value by a block 69.

The maximum value of NXX is set by a block 70 inquiring if there are any steps remaining on the X axis and if not, the maximum X movement NXXMAX, is set to 0 by a block 71. However, when there are steps, a block 72 determines if the number of steps remaining to be taken less the number of steps required for deceleration (BLX-BNX) is greater than twice the number of velocity change lengths. If the difference is greater, indicating that the motor may accelerate and still have sufficient remaining movement to effect deceleration, the new value of NXXMAX is set equal to the velocity change length value plus 1 by a block 73. On the other hand if the difference is less, a block 74 determines whether or not deceleration should occur by comparing the number of steps remaining to the number of velocity change lengths. If more steps remain, then the motor is allowed to maintain the same velocity as the previous length and a block 75 sets NXXMAX equal to the value of NCX. If there are less steps, the motor should decelerate and a block 76 sets and maximum X value at the value of NCX less 1.

The same selection of the minimum and maximum values for the Y axis is effected by the blocks 77, 78 and 79 for the minimum values while blocks 80 and 81 set the maximum value NYXMIN at 0 if no steps remain. Blocks 82 and 83 increase the value of Y by 1 for acceleration while blocks 84 and 85 maintain the same value and a block 86 is used for deceleration and reduces the previous value by 1.

The representations NCX and NCY while maintaining a count of the velocity change lengths may have the same value as the NXX and NYX length values, respectively for the initial lengths. This is caused by the velocity change lengths increasing by one for each accelerating length and the output value for an axis also normally increasing by 1 for each accelerating length. For decelerating lengths, each decreases by one. The first length L1 is not considered. However, if the change in value between adjacent lengths may vary by more than 1 step, then there may not be correspondence between the NXX and NCY and NYX and NCY values. Further, the herein disclosed method has the number of decelerating lengths equal to the number of accelerating lengths so that essentially there is the same change in velocity whether accelerating or decelerating, though, if desired, different changes may be used.

Upon the selection of the maximum and minimum values for NXX and NYX the method proceeds from point P3 on FIG. 5A to point P3 on FIG. 5B wherein it encounters a block 87 and begins the determination of which of the values are possible values for the length by being within the maximum deviation. Basically the computation is as disclosed in my above-mentioned patent of whenever an X step is taken, the original value of Y (BLOY) is subtracted from an error register while if a Y step is taken then the original value of X (BLOX) is added to the error register though, of course, diminishing values of X and Y may be used, if desired. Whenever the error register is negative, i.e., has a negative count, then a Y step should be taken while if the error register has a positive or zero count then an X step should be taken. Block 87 sets the deviation in the E register for the minimum length move by algebraically adding to the count of the E register the value of the deviation produced by the minimum move, namely EC that had been determined. Thus, in one calculation the total of the deviation of all the steps in a minimum move is determined irrespective of the number of steps in the minimum move.

A block 88 initially sets the output values of NXX and NYX to their respective minimum values while a block 89 determines the actual vector length of the minimum value. A block 90 then determines the direction of the deivation for the minimum move by comparing it with zero and if equal or greater would cause an increase in the X value while if less than zero it would require that a Y step is taken. If E is positive, requiring an increase in X, the block 91 is encountered to determine if the value of NXX equals its maximum value. If it does, then X is not increased while if it does not, then the X value is increased by 1, the deviation E determined by block 87 is stored as ER and E is decreased by the original value of Y (BLOY) all by a block 92.

The method then inquires that if the X value is increased by one from its minimum value, will the commanded velocity be exceeded. A block 93 stores the value of DA as DR as determined by the block 89 and computes the new value of DA for the increased X value. A block 94 then questions if any one of the previous lengths had been faster or slower than the commanded path velocity and if it is not, a block 95 inquires if the actual path velocity DA determined by block 93 is less than the commanded path velocity DP. Again if it is not, which indicates that a further increase in the value of NXX may be made, the sequence flows or returns to block 90 which again questions the sign of the value of E as now set by block 92 and if it is still positive and the intermediate value of NXX is not equal to NXXMAX, then block 92 again increases NXX by one, sets ER to the new value of E and decreases E by BLOY. Again the blocks 93, 94 and 95 determine if the actual path velocity will be exceeded and if it is not there is again a return to the block 90 which if still indicating that E is greater than 0 causes the sequence to flow to block 91. However, as NXX has been increased to NXXMAX, the sequence then flows to a block 96.

It will be understood that if after the minimum X move was increased by 1 which caused the value of E to change its sign, requiring a Y increase, then a block 97 would have inquired if the minimum value of Y equaled its maximum. If not, then a block 98 would have increased the minimum value of Y by 1, stored the deviation and changed the error register E by adding the value of BLOX thereto with again the blocks 93, 94 and 95 determining if the commanded path velocity is exceeded.

In the event that the path velocity has been exceeded by the last increase in either X or Y, and so determined by the block 95, the flip-flop B would have been set to the 1 state by a block 99 and the accumulated velocity error register ED would have had the difference between the actual and commanded velocity added thereto by a block 100. Thus the block 95 prevents further increase to the numerical values when the path velocity DP is exceeded and B=0.

On the other hand, if in a prior length the actual velocity was greater than the programmed velocity, block 94 (by B being in the 1 state) would have directed the sequence to a block 101 instead of to block 95 where the values of DA and DP are compared. If DA is less than DP then either X or Y values could have been increased by 1 by returning to the block 90 with the increases continuing until DA equaled or exceeds DP. In the latter instance a block 102 queries the algebraic count of the velocity error register and if negative, indicating that the previous velocities have been slower than the commanded velocity and hence a slight increase of DA over DP is acceptable, it permits the sequence to flow to the block 96.

If, however, ED is greater than zero then the block 102 directs the sequence to a block 103 which determines whether the last increase was in X or Y and subtracts the increase by either a block 104 or a block 105. A block 106 then up-dates the DA and E registers to the values of DR and ER respectively which they had before the last increase before continuing to the block 96 which up-dates the velocity error register ED. The method exits from FIGS. 5B to 5C by corresponding points P4 after block 96 and at P4 the values of NXX and NYX have been determined as to deviation and velocity. The blocks 96 and 103-106 are bypassed to point P4 if block 101 determines the rare instance that DA equals DP.

The portion of the chart shown in FIG. 5C is used to up-date the various registers and compute EC, the deviation for the minimum length for the next length for block 87. For the EC computation, which basically alters the value of EC for the minimum length for the present length to the minimum length for the next length by the difference therebetween. A block 107 determines if the present value of NXX is 0 and if so then the information proceeds to a block 108 while if not, a block 109 sets a minimum value for the next length denoted NXXN, to the value of the present NXX less 1. The block 110 then determines if the new minimum X value is equal to, greater or less than the minimum X value of the present length for which the EC value had been stored in order to up-date the EC register. NXXN and NXXMIN can only vary by 1 and if the former is the lesser indicating that there is one less X step than in the previous minimum length, block 111 adds BLOY to the original EC value while if greater, indicating that the new minimum length is one X step longer than the previous minimum length, then a block 112 subtracts the value of BLOY from the original EC value. If, of course, the two minimum lengths are equal, then there is no change in the value of EC caused by the X number.

For the Y number change in EC, a block 113 determines if NYX is 0 and either sets the new minimum value of NYXN to zero by a block 114 or if it is not zero, a block 115 decreases the present value of NYX by 1 with the sequence then flowing to a block 116. This block then changes the value of EC by way of blocks 117 and 118 by either subtraction or addition of the original value of BLOX if NYXN does not equal NYX.

The next block encountered is block 119 and it and the subsequent blocks 120-122 are used to up-date the values of NCX, BNX and BLX. If NXX equals NCX, the last length was not a change in velocity length and hence block 119 does not change the value of NCX or BNX. If NXX is greater than NCX, then the length is an accelerating length and a block 120 increases the number of decelerating steps (BNX) needed and also increases NCX by 1. If NXX is less than NCX, then the length is a decelerating length which requires a block 121 to first decrease the value of NCX by 1 and then decrease the value of BNX by this new NCX value. A block 122 then alters the number of steps remaining, BNX, by subtracting the value of X for the length.

Blocks 123, 124, 125 and 126 perform the same function for the Y axis in that they up-date the NCY register, the BNY register and the BLY register. The completion of the operation performed by block 126 then directs the sequence back to the block 61 on the first sheet of the flow chart through corresponding reference character P5 and the block 61 then supplies the determined values of NXX and NYX to the storage boxes 30 and 34 shown in FIG. 4.

While blocks 107 through 118 are used to determine the deviation for the minimum length for the next length by subtraction, it will be clear that instead thereof, the value of EC may be calculated by multiplying NYXMIN times BLOX and subtracting therefrom NXXMIN times BLOY. However, such a calculation is not only relatively time consuming but also requires relatively high content registers. Similarly the computation in blocks 89 and 93 of the square root of the sum of the squares to find the actual path velocity also requires the use of high content registers and somewhat time consuming multiplication and addition steps. It is thus preferred to utilize the embodiment of the invention shown in FIG. 6 for the computation of DA as it uses relatively easy and quick division and is thus more susceptible for use by a programmed computer.

Figure 6:
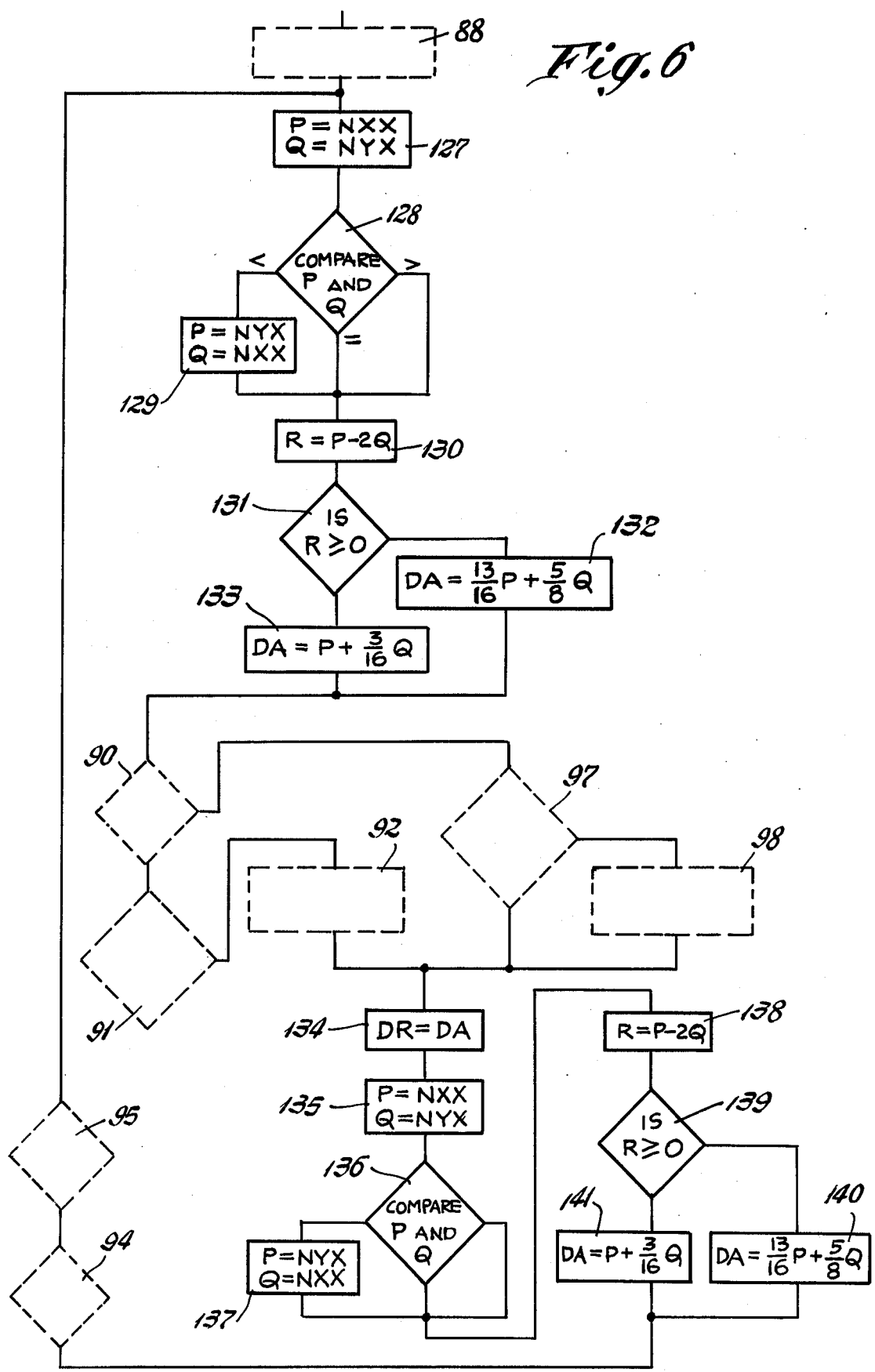
FIG. 6 is a flow chart of a further embodiment of the process used to determine the actual path of FIG. 7.

The steps shown in the chart of FIG. 6 approximate the value of DA by within a small percentage of the actual value determined by the square root of the sum of the squares computation. Thus, referring to FIG. 6, blocks 127 through 133 are shown connected in the sequence flow between the blocks 88 and 90 as a substitute for the block 89. In this embodiment of calculating the approximate value of the actual path velocity, a block 127 substitutes representations P and Q for the NXX and NYX values, respectively and then compares them by a block 128 to make the representation P at all times greater than Q, either by maintaining the same relationship or else by inversion by way of a block 129 before a block 130 is encountered. This block determines the value of the representation R by equating it to the difference between P and two times the value of Q with the resultant value of R being compared by a block 131 to zero. If R is negative by being less than zero, a block 132 determines the value of DA by the fractional multiplication of P and Q shown in the block while if R is equal to zero or positive, a block 133 determines the value of DA by the sum of the value of P plus the fractional part of Q shown in the block. The sequence then flows into the block 90.

For the block 93, there is substituted blocks 134 through 141 before the sequence flows through the block 94. Block 134 merely maintains the operation of the setting of the DR register to the DA value as called for in block 93. The proceeding blocks 135 through 141 are identical to the blocks 127 through 133 and determine the approximate value of DA in the same manner.

Shown in FIG. 7 is a sketch of the same commanded path 10 shown in FIGS. 1 and 2 of X equals 41 and Y equals 13 from a starting position S to a final position P. Also shown and indicated by the reference numeral 142 is an actual path determined by the embodiment shown in FIG. 6 together with the limitation of the value of the commanded path velocity (DP) being a maximum of four steps per length. This value of DP when considered with the duration of a time interval of approximately 1/200th of a second produces a maximum velocity of 800 steps per second which if utilized in a machine tool having a five pitch lead screw with a 200 step per revolution motor would achieve a maximum movement of 48 inches per minute.

The path 142 is composed of 15 lengths denoted M1 through M15, respectively, and it will be noted that the actual path velocity is permitted in some instances such as in lengths M5 and M7-M10, to slightly exceed the commanded path velocity. However, while slightly exceeding the commanded velocity, they so very closely approximate the commanded velocity as to be acceptable especially as the accumulated actual velocity error (DA-DP) does not excessively exceed a reasonable value.

In a determination of one specific length, such as length M6, the following values using the embodiment shown in FIG. 6 have been found to occur during the determination: NXXMIN=3; NXXMAX=5; NYXMIN=0; NYXMAX=2; E=−18; NXX=3; NYX=0; DA=3; NYX=1; ER=−18; E=23; DR=3; DA=3 3/16; NXX=4; ER=23; E=10; DR=3 3/16; DA=4 3/16; NXX=3; DA=3 3/16; E=23; ED=−⅝; NXXN=2; EC=−26; NYXN=0; NCX=3; BNX=3; BLX=27; BYL=8; output, NNX=3, NYX=1.

While the additional steps are each added to the minimum length, it is contemplated that the deviation may be decreased by the use of simulated and actual steps in the manner disclosed in my U.S. Pat. No. 3,585,478. It is also noted that by the use of lengths and the limitation on the change in extent between adjacent lengths, that pulses are more smoothly supplied to the motor than if each step were individually determined. It will be apparent that variations may be made in the program without departing from the spirit of the invention. For example, in place of using the minimum length at all times from which each length is initially determined the maximum length for acceleration may be used, or for intermediate lengths in the path where the velocity is essentially constant, the same length as the prior length.

It will be accordingly understood that there has been disclosed a numerical control system for providing an essentially linear movement along a commanded path from a start position to an end portion. The commanded path is expressed in the number of steps between the positions along two axes and the present invention subdivides the actual movement into a plurality of successive lengths. The extent of each succeeding length is determinable within a range of possible lengths from the extent of a prior length. One of the possible lengths is then selected and a single calculation is made of the deviation which such a length would make from the commanded path. Subsequent calculations are then made to select from the remaining possible lengths, the length most suitable to be used considering not only the deviation from the commanded path but also velocity limitations that may be imposed. After the selected length has been determined, its extent is used to determine the extent of the next length by again performing a single calculation for one of many possible lengths, thereby avoiding the necessity of an individual calculation for each step in a length. The present method and apparatus not only is extremely susceptible to be performed by a programmed general purpose computer but also minimizes the amount of computer time required for the determination to much less than the normal time for the system to execute each length, thereby enabling time sharing of the computer between lengths.

The computer determination merely supplies an electrical representation of the number of steps on each axis and this representation is processed initially into the same number of pulses for the respective axis. The pulses for each axis are approximately evenly spaced over a time interval with their rate being dependent on the number of pulses required of the same duration time interval for each length. Each pulse, as produced, is essentially simultaneously translated into a motor step for its axis thereby assuring that both axes will produce the required movement for a length at the same time.

Variations and modifications may be made within the scope of the claims and portions of the improvements may be used without others.

I claim:

1. The method of producing actual relative movement along two axes within a maximum deviation from a commanded path comprising the steps of subdividing the movement into a plurality of successive lengths, selecting the extent of each length to that which would produce a movement which would be within the maximum deviation and which also has a relationship with its immediately prior length and producing a relative movement for the extent of each length with the movement for each length occurring over the same constant time interval for each length and in which the extent of each length is defined by a number of increments on each axis, the step of selecting normally selects each length to have an extent consisting of a plurality of increments on each axis and in which the selecting relationship causes a selected length to be no more than a set number of increments different from the immediately prior length.

2. The invention as defined in claim 1 in which the set number is one on each axis.

3. The invention as defined in claim 1 in which the step of selecting includes knowing the value of the deviation produced by the step of selecting for the immediately prior length and algebraically adding thereto the value of the deviation produced by the length being selected.

4. The invention as defined in claim 1 in which the maximum velocity of the commanded path is provided and in which the step of selecting includes eliminating all lengths which would excessively exceed the maximum velocity.

5. The invention as defined in claim 4 in which the maximum velocity is provided as a number of steps in a length and in which the step of selecting excludes all possible lengths having a total movement that would exceed the maximum velocity by more than two steps.

6. The invention as defined in claim 4 in which the maximum velocity is provided as a number of steps in a length and in which the step of selecting excludes all possible lengths having an extent that would exceed the maximum velocity but only if the preceding selected length also had an extent which excessively exceeded the maximum velocity.

7. The invention as defined in claim 1 in which the actual movement has a starting portion having successive starting lengths and in which the step of selecting excludes lengths for a starting length that have a lesser extent than the extent of the immediately prior length.

8. The invention as defined in claim 1 in which the actual movement has an ending portion having successive ending lengths and in which the step of selecting excludes lengths for an ending length that have a greater extent than the extent of the immediately prior length.

9. The invention as defined in claim 1 in which the step of producing the movement includes the step of defining the extent of a selected length by a number of increments for each of the two axes.

10. The invention as defined in claim 9 in which the step of producing includes the steps of producing a train of pulses for each axis with each train having essentially evenly spaced pulses which are equal in number to the number of increments and in which an increment is produced essentially simultaneously with the appearance of each pulse.

11. The invention as defined in claim 1 in which the step of producing includes the step of making the extent of movement of each length occur over the same time interval for each length on both axes.

12. The method of producing actual relative movement along two axes within a maximum deviation from a commanded path wherein the actual movement consists of a plurality of successive lengths with the extent of each length being defined by a number of increments on both axes and with the method including the selecting of the extent of most intermediate lengths, said selecting including the steps of providing an initial extent related to the extent of the immediately prior length, altering the initial extent at least one increment, determining after each increment if the altered length would produce a movement within the maximum deviation and producing a movement of the altered extent of the length only if the movement was within the maximum deviation with the movement for each length occurring over the same constant time interval for each length.

13. The method of producing actual movement along an axis required by a commanded path comprising the steps of subdividing the movement into a plurality of successive lengths, defining the extent of each length by the number of increments thereon, said subdividing causing most lengths to have a plurality of increments, limiting each length to a difference in extent from its immediately preceding length only within a set number of increments, and producing a movement length corresponding to the number of increments in each length with the movement for each length occurring over the same constant time interval for each length.

14. An apparatus for producing actual movement along two axes within a maximum deviation of a commanded path comprising motor means connected to each axis for translating each pulse received essentially simultaneously into an increment of movement, means for receiving information of a commanded path, means for subdividing the commanded path into a plurality of lengths and means for producing the extent of each length as a group of pulses for each axis and for supplying the pulses to the respective axis motor means with the pulses being supplied occurring over the same constant time interval for each length and in which the subdividing means includes means for causing each length to have an extent which bears a relationship to its immediately prior length.

15. The invention as defined in claim 14 in which the subdividing means defines each length by a numerical number of increments on each axis and in which the producing means produces for each axis a number of pulses that equals the numerical number for that axis.

16. The invention as defined in claim 14 in which the means for producing includes means for changing the duration of the constant time interval for different commanded paths.

17. The invention as defined in claim 14 in which the means for subdividing includes means for causing each length to have an extent which is within a maximum deviation from the commanded path.

18. The invention as defined in claim 14 in which the subdividing means normally selects the most suitable length from a plurality of possible lengths and includes means for determining the amount of deviation produced by each length by initially calculating the deviation produced by one possible length.

19. The invention as defined in claim 18 in which the determining means calculation determines the amount of deviation for a possible length by having means for algebraically adding the deviation produced by the total extent of the possible length on one axis and the deviation produced by the total extent of the possible length on the other axis.

20. The invention as defined in claim 18 in which the determining means calculation to determine the amount of deviation for a possible length includes means for altering the deviation produced by the immediately prior length by the difference in extent between the possible length and the prior length.

21. The invention as defined in claim 14 in which the subdividing means determines a length at least for the lengths intermediate the movement by selecting the most suitable length from possible lengths, each having a different extent but bearing a constant relationship to each other.

22. The invention as defined in claim 21 in which the beginning of the movement includes starting lengths and in which the subdividing means selects for most starting lengths the most suitable length to be both the length that is within the maximum deviation and is larger in extent than the immediately prior length whereby said starting lengths tend to successively increase in extent.

23. The invention as defined in claim 21 in which the ending of the movement includes ending lengths and in which the subdividing means selects for most ending lengths the most suitable length to be both the length that is within the maximum deviation and is smaller in extent than the immediately prior length whereby said ending lengths tend to successively decrease in extent.

24. The invention as defined in claim 14 in which there is a commanded path velocity, in which the subdividing means selects for each length from a group of different extent possible lengths the length most suitable for the movement and in which the subdividing means excludes as possible lengths those lengths which have an extent which would excessively exceed the commanded path velocity.

25. The invention as defined in claim 24 in which the subdividing means includes means for maintaining the accumulated error between the actual velocity of at least some of the intermediate lengths and the commanded path velocity and in which a length that exceeds the commanded path velocity is not excluded if the accumulated velocity error indicates that the commanded path velocity is greater than the actual path velocity.

* * * * *